(12) United States Patent
Ellinger et al.

(10) Patent No.: US 9,073,757 B2
(45) Date of Patent: Jul. 7, 2015

(54) ELECTRODE AND METHOD FOR SUPPLYING CURRENT TO A REACTOR

(75) Inventors: Norbert Ellinger, Postmuenster (DE); Robert Ring, Haiming (DE); Josef Wiesbauer, Braunau (AT)

(73) Assignee: Wacker Chemie AG, Munich (DE)

( * ) Notice: Subject to any disclaimer, the term of this patent is extended or adjusted under 35 U.S.C. 154(b) by 552 days.

(21) Appl. No.: 13/489,447

(22) Filed: Jun. 5, 2012

(65) Prior Publication Data

US 2012/0327543 A1 Dec. 27, 2012

(30) Foreign Application Priority Data

Jun. 22, 2011 (DE) .......................... 10 2011 077 967

(51) Int. Cl.
*C01B 33/035* (2006.01)
*H01B 17/26* (2006.01)
(Continued)

(52) U.S. Cl.
CPC .............. *C01B 33/035* (2013.01); *H01B 17/26* (2013.01); *B01J 19/002* (2013.01); *B01J 19/0073* (2013.01); *B01J 19/087* (2013.01); *B01J 2219/00135* (2013.01); *B01J 2219/00207* (2013.01); *B01J 2219/00213* (2013.01); *B01J 2219/00225* (2013.01); *B01J 2219/00247* (2013.01); *B01J 2219/00268* (2013.01); *B01J 2219/0801* (2013.01);
(Continued)

(58) Field of Classification Search
CPC .... C07B 33/035; H01B 17/26; H01B 17/303; H01B 17/22; B01J 12/002; B01J 19/0073; B01J 19/087; H02H 3/08
See application file for complete search history.

(56) References Cited

U.S. PATENT DOCUMENTS 3,286,685 A 11/1966 Sandmann et al.
3,662,367 A * 5/1972 De Veau et al. ............... 340/604
(Continued)

FOREIGN PATENT DOCUMENTS

CN 101538042 A 9/2009
DE 2328303 A1 1/1975
(Continued)

OTHER PUBLICATIONS

Insaulation porcelainm Free Online encyclopedia, http://encyclopedia2.thefreedictionary.com/Insulation+Porcelain, 1979, pp. 1.*
(Continued)

*Primary Examiner* — Zeev V Kitov
(74) *Attorney, Agent, or Firm* — Caesar Rivise, PC

(57) ABSTRACT

Disclosed is a method for supplying current to a reactor, wherein electrode(s) of an electrical energy network (EEN), which is DC-isolated from ground potential, is/are fed through a reactor wall and connected to an electrically conductive element (ECE) so that an operating voltage is applied to the ECE and electrical current flows through it. A seal of electrically insulating material is provided between the wall and the electrode. The EEN is monitored for insulation faults. A fall below a particular insulation resistance triggers shutdown of the electrical energy supply. The switching threshold is determined by taking into account at least one of the following parameters: seal geometry, seal material, supply voltage and maximum possible electrical energy input into the seal immediately before shutdown, triggered by the maximum theoretically possible leakage current through the seal. A device and an electrode having respective seals are also disclosed.

16 Claims, 1 Drawing Sheet

(51) Int. Cl.
*B01J 19/00* (2006.01)
*B01J 19/08* (2006.01)

(52) U.S. Cl.
CPC .. *B01J 2219/0809* (2013.01); *B01J 2219/0815* (2013.01); *B01J 2219/0841* (2013.01); *B01J 2219/0875* (2013.01)

(56) References Cited

U.S. PATENT DOCUMENTS

| | | | |
|---|---|---|---|
| 4,331,997 A * | 5/1982 | Engel et al. | 361/93.2 |
| 4,536,642 A | 8/1985 | Hamster et al. | |
| 5,193,100 A | 3/1993 | Hack | |
| 6,110,322 A * | 8/2000 | Teoh et al. | 156/345.52 |
| 6,555,999 B1 * | 4/2003 | Lindsey et al. | 324/76.11 |
| 2003/0141017 A1 | 7/2003 | Fujisato | |
| 2007/0073075 A1 | 3/2007 | Paetzold | |
| 2008/0197832 A1 * | 8/2008 | Yokoyama | 324/72 |
| 2009/0238992 A1 | 9/2009 | Endoh et al. | |
| 2010/0147219 A1 * | 6/2010 | Hsieh et al. | 118/723 R |
| 2011/0305604 A1 | 12/2011 | Stöcklinger | |
| 2012/0031889 A1 * | 2/2012 | Komatsu | 219/201 |
| 2012/0080148 A1 * | 4/2012 | Zhang | 156/345.3 |

FOREIGN PATENT DOCUMENTS

| | | |
|---|---|---|
| DE | 3024320 A1 | 4/1982 |
| JP | 4227472 A2 | 8/1992 |
| JP | 2007091587 A2 | 4/2007 |
| JP | 2009221058 A2 | 10/2009 |
| WO | 2010068849 A1 | 6/2010 |
| WO | 2010083899 A1 | 7/2010 |
| WO | 2011120112 A1 | 10/2011 |

OTHER PUBLICATIONS

Polychloroprene rubber, Free Online Encyclopedia, http://encyclopedia2.thefreedictionary.com/Polychloroprene+Rubber, 1979, pp. 1.*

Melo et al., "Experience with On-Line Monitoring of Capacitance and Tangent Delta of Condensive Bushings", Transmission and Distribution Conference and Exposition: Latin America (IEEE/PES, 2008).

Abstract for DE 2328303 (1975).

PatBase abstract for JP 2009-221058 (2009).

* cited by examiner

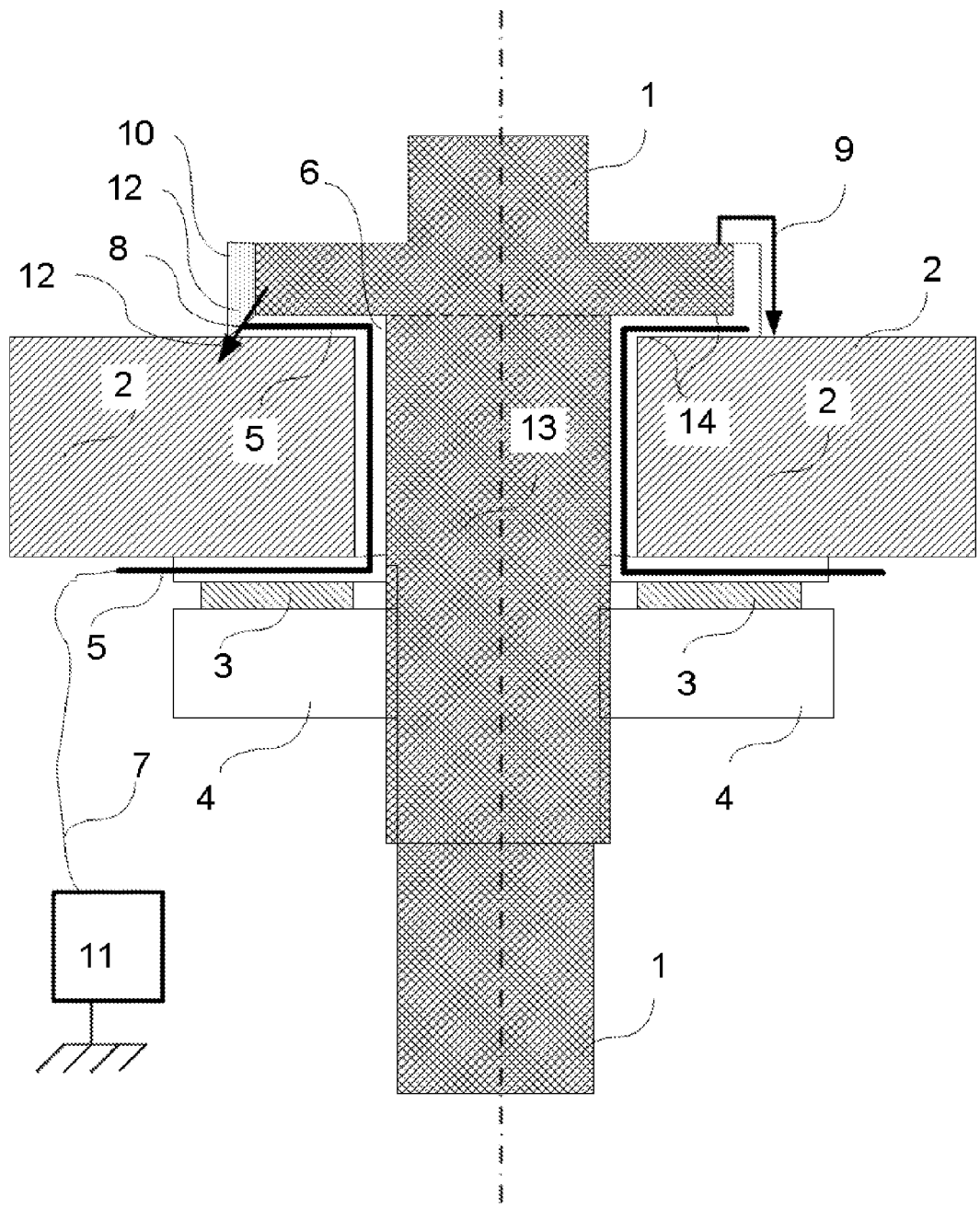

ELECTRODE AND METHOD FOR SUPPLYING CURRENT TO A REACTOR

BACKGROUND

The invention relates to a device for the simultaneous monitoring, sealing and electrical insulation of an electrode and to a method for supplying current to a reactor.

In particular, the invention relates to the current supply of chemical reactors which comprise a reactor chamber in which certain reaction gases are heated to a temperature by means of heating elements, the heating elements being heated by direct current flow. To this end, the heating elements are made of an electrically conductive material and are connected to a current supply. The invention likewise relates to the current supply of so-called Siemens reactors.

For the deposition of polysilicon according to the Siemens process, highly pure elemental silicon is deposited from the gas phase on the surface of silicon rods. In this case, elemental silicon is deposited from the gas phase in a deposition reactor on the surface of a thin silicon rod heated to from 900 to 1200° C. from a mixture of hydrogen and halosilanes (for example trichlorosilane) or a silicon compound containing hydrogen.

The silicon rods are held in the reactor by special electrodes, which generally consist of highly pure electrographite. In each case, two thin rods with different voltage poling on the electrode holders are connected at the other thin rod end by a bridge to form a closed circuit. Electrical energy for heating the thin rods is supplied via the electrodes and their electrode holders. A mixture of hydrogen and halosilanes is supplied through inlet nozzles on the bottom plate of the deposition reactor. The halosilanes decompose on the surface of the thin rods. The diameter of the thin rods thereby grows. After reaching a desired setpoint diameter of the silicon rods, the deposition process is terminated and the hot silicon rods are cooled and extracted.

In this case, particular importance is attached to the protection of the electrode and of the seal surrounding the electrode holder. Since there is a trend towards ever longer and heavier rods in shorter deposition cycles, the arrangement and shape of the electrode seal protective bodies and the material of the seal to be protected are specifically of importance. This is because the possible perturbations influencing yield and/or quality in the polysilicon deposition process can be avoided by an optimized arrangement. These possible perturbations include electrical failures, for example due to ground faults, during the deposition and a sealing defect of the reactor due to the feedthrough of the current-carrying electrodes in the reactor bottom of the CVD reactor.

Furthermore, very different requirements are placed on the silicon rods and the deposition process, and therefore on the electrodes and their protection, depending on the subsequent use of the silicon rods produced in this way. If the polycrystalline silicon is subsequently used in silicon chunks for solar and electronic applications, for example, the silicon rods must not collapse during or after the deposition process in the deposition reactor or be contaminated by emerging extraneous substances, for example from seal materials touching the product.

WO Patent 2010/083899 A1 discloses an electrode protection device according to the prior art. In this case, thin rods are described in a graphite adapter, which engages in a graphite clamping ring which itself interacts via a quartz ring with the bottom plate of the CVD reactor for producing polycrystalline silicon according to the monosilane process.

The perturbations influencing the possible yield and/or quality in the polysilicon deposition process include electrical failures due to ground faults during the deposition. This perturbation gives rise to a difference between the real output and the maximum possible output.

In the prior art, attempts have been made to resolve this problem by sealing and insulating the electrode holders.

It is known from WO 2010/083899 A1 to shield the seals of the electrode holders against thermal loading by means of protective rings made of quartz.

DE 23 28 303 A1 describes a device for producing rods and tubes of silicon by depositing the relevant semiconductor material from the gas phase on the lateral surface of a heated elongate support, in particular made of silicon or graphite, consisting of a reaction vessel which comprises a metal base plate and is provided with at least one electrode which is used for holding one end of the elongate support and for heating the support and is electrically insulated and fed in a leaktight manner through the base plate, characterized in that a first electrode part consisting of metal is fastened in the base plate with the interposition of a sealing layer of inert insulating material, in particular tetrafluoropolyethylene, and comprises a projection extending into the reaction space, on which is replaceably seated a further electrode part consisting of metal or carbon, which part comprises the fitting surface intended for receiving and holding the support on its free surface.

A first part of the electrode holder, consisting of metal, is thus fastened in the bottom plate with the insertion of a sealing layer made of inert insulating material.

JP 2009-221058 A2 discloses a seal and insulation making use of a special zirconium ceramic, of flexible graphite, and coated O-rings as a seal. Such materials have refractory stability and make it possible to seal the gap between the electrodes and the base plate.

WO 2010/068849 A1 describes improved thermal insulation in the region of the feedthrough of the electrode holder through the bottom plate using a metal body, which is provided with an insulating surface coating.

However, the devices known to date do not present sufficient protection of the seal of the electrode holder. This has the effect that the probability of failure due to corrosive effects and ground faults is increased. Furthermore, sufficient protection of the seal against corrosion and therefore discharge of substances which influence the product quality (in particular dopants) has not yet been found.

DE 3024320 A1 discloses a device for the high-temperature treatment of gases, consisting of a thermally insulated housing having gas inlet and gas outlet openings as well as inert resistance heaters, which are arranged between these openings and are heated by direct current flow. The heating of the electrically conductive resistor bodies is preferably carried out using a star circuit in a symmetrical polyphase AC system. Individual heater groups can in this case be regulated differently to one another, i.e. heated differently by electrical current flow.

An example of such a device is a reactor for converting silicon tetrachloride into trichlorosilane.

Trichlorosilane is used in the Siemens process for producing polycrystalline silicon. In this case, silicon is deposited on heated thin rods in a reactor. Trichlorosilane in the presence of hydrogen is used as process gas. During the conversion of trichlorosilane (disproportionation) into deposited silicon, large amounts of silicon tetrachloride are formed.

By reaction with hydrogen and oxygen at elevated temperatures in combustion chambers, for example, highly disperse silica can be produced from silicon tetrachloride.

The economically most advantageous use of silicon tetrachloride is, however, conversion into trichlorosilane. This is carried out by reacting silicon tetrachloride with hydrogen to form trichlorosilane and hydrogen chloride. It is thereby possible to produce trichlorosilane from the silicon tetrachloride byproduct formed during the deposition, and to feed this trichlorosilane back into the deposition process in order to produce elemental silicon.

The conversion of silicon tetrachloride with hydrogen into trichlorosilane is typically carried out in a reactor at high temperatures, at least 600° C., ideally at least 850° C. and at a pressure of 0-30 bar.

To this end, electrical current is fed directly through the conductive heating elements and the electrical energy is converted into heat in the heating element by the electrical resistance.

The heating elements usually consist of carbon-containing materials, for example graphite, CFC, silicon carbide or similar materials.

It is known that the carbon-containing installed reactor components are exposed to chemical attack during the conversion of silicon tetrachloride in the presence of hydrogen.

The chemical attack of these carbon-containing components gives rise to carbon deposits, which are electrically conductive and can therefore lead to ground faults of the electrical energy network. Furthermore, chemical attack can also lead to component failures of the internal components, which then entails flaking or splitting of small parts which can in turn lead to ground faults. The problem with these ground faults is that they cannot be distinguished from damage to the electrode seals. If there is damage to the electrode seal, the current supply and the reactor have to be taken out of operation since continued operation can lead to a sealing defect and a reaction gas leakage, which needs to be prevented.

Conventionally, nonmetallic or electrically nonconductive seals are used for electrodes, since these fulfill a twofold function, namely electrical insulation of the electrode from the reactor wall and a sealing function. However, the temperatures in these reactors are so high that there are scarcely any electrically insulating as well as chemically stable materials which fulfill the function of electrical insulation and a pressure-tight seal.

Furthermore, attempts may be made to protect the seals from excessively high temperatures by additional installed components in the reactor.

In spite of this, seal damage triggered by unintended electrical currents from one electrode through the reactor wall to another electrode cannot be ruled out by such measures.

The object of the present invention was based on this problem.

DESCRIPTION OF THE INVENTION

The object is achieved by a method for supplying current to a reactor, wherein one or more electrodes, which are fed through a wall of the reactor, of an electrical energy network which is DC-isolated from ground potential are respectively connected to an electrically conductive element so that an operating voltage is respectively applied to the at least one electrically conductive element and electrical current flows through it, wherein there is respectively a seal made of an electrically insulating material between the wall of the reactor and the electrode, wherein the electrical energy network is monitored for insulation faults and a fall below a particular insulation resistance triggers shutdown of the electrical energy supply, and wherein the switching threshold is determined by taking into account at least one parameter from the group consisting of seal geometry, seal material, supply voltage and the maximum possible electrical energy input into the seal immediately before shutdown, triggered by the maximum theoretically possible leakage current through the seal.

This method is preferably used in the Siemens process, the electrically conductive elements being thin rods which are heated and on which silicon is deposited. The wall of the reactor is in this case a bottom plate of the reactor. The insulating seal is preferably located between the bottom plate and an electrode, or electrode holder.

It is also preferable to use the method for thermal treatments, particularly preferably high-temperature treatments, of gases. The electrically conductive elements are in this case preferably carbon-containing heating elements, or resistance heaters, which are used to heat the gas or gas mixture to be treated to a particular temperature of at least 300° C.

The gases treated preferably comprise at least one component containing silicon. The silicon-containing gas is particularly preferably silicon tetrachloride or another halosilane. The treatment chamber preferably also contains hydrogen.

Without restricting the general concept of the invention in any way, the aforementioned conversion of silicon tetrachloride will be mentioned by way of example here.

For the conversion, hydrogen is required as a second reactant gas. The conversion preferably takes place at a temperature of from 800 to 1500° C. and at a pressure of from 0 to 30 bar or more. It is particularly preferable in this case to select a pressure which is greater than or equal to a supercritical pressure of the reactant gases. The molar ratio $H_2$:STC is preferably from 1:1 to 10:1.

The electrodes of the current supply have an insulating seal. Insulation monitoring is used which is appropriate for the seal employed.

The Inventors have discovered that it is necessary to detect and then promptly switch off an electrical leakage current or arc discharge which is destructive to the seal.

At the same time, however, the running time of the reactor until the next dismantling and cleaning should be kept as long as possible despite the conductive contamination.

An arc discharge from one electrical potential to another inside the reactor is destructive to the seal only if it takes place in the vicinity of the seal.

If the heating elements touch far away from the electrode without touching other parts, this usually does not constitute a problem because of the solid construction of the reactor.

If the electrical energy network is grounded, an arc discharge or leakage current is destructive to the seal only if it strikes from the electrode through the seal, which at the same time is also insulation, onto the reactor wall. Otherwise, an arc discharge or leakage current destructive to the seal can only occur if it strikes from an electrode through the associated electrode seal to the reactor wall, and then in turn through the electrode seal of a second electrode to this second electrode.

In both cases, the reactor wall is part of the arc discharge circuit.

In a grounded network (the reactor wall is grounded and connected to the potential of the supplying network), by means of fault current detection it is possible to detect and switch off a fault current from the electrode through the seal to ground potential. A disadvantage with this arrangement is the fact that one fault through a seal is sufficient to induce shutdown. Such an arrangement is therefore less preferred.

The embodiment of the supplying network as a network DC-isolated from ground potential is preferred.

This DC-isolated network is preferably monitored by commercially available insulation monitoring apparatuses, which are technologically based on the known principles of voltage injection of any type with respect to ground potential.

If contamination or thermal damage then leads to insulation faults of the electrode insulation, then the system can promptly be shut down without seal damage due to leakage currents or arc discharges taking place.

Studies have shown that only insulation faults significantly below 10 ohms actually lead to seal damage, while insulation faults ranging down to 10 ohms can also occur during operation.

For this reason, an apparatus having a measurement range starting from 0 ohms is preferred for the seal monitoring.

The switching threshold preferably lies in the resistance range of between 0 and 1000 ohms, particularly preferably between 0-100 ohms and more particularly preferably between 0-10 ohms.

Taking into account the seal configuration, it is now possible to define a maximum permissible power loss for an insulation fault.

The maximum power loss is defined by a maximum energy input which is nondestructively permissible for the respective material type and the design configuration of the seal. A safety margin is preferably also taken into account.

From this maximum permissible power loss and the operating voltage of the heating elements, a minimum permissible insulation fault resistance, up to which no seal damage occurs, can then be calculated dynamically.

In this context, the lower the electrode operating voltage is, for a constant power loss, the lower the insulation fault may be.

By correspondingly increasing the calculated values, an advance warning can also be generated before shutdown, which provides the opportunity to run the system down expediently.

The method according to the invention thus makes it possible to detect impending seal damage indirectly via the insulation resistance of the electrical heater network, when it is configured as a DC-isolated network.

Preferably, the system is shut down when the switching threshold is reached. This makes it possible to prevent damage to the seal due to leakage currents or arc discharges, and therefore gas leakage.

In order to maximize the system availability, the shutdown limit may be adapted as a function of the operating voltage.

Preferably, the switching threshold is determined once by taking into account the seal geometry and/or the operating voltage and/or the maximum possible electrical energy input into the seal immediately before shutdown, triggered by the theoretically possible leakage current through the seal.

Also preferably, the switching threshold is determined continuously during operation by taking into account the seal geometry and/or the operating voltage and/or the maximum possible electrical energy input into the seal immediately before shutdown, triggered by the theoretically possible leakage current through the seal.

The object of the invention is also achieved by a method for supplying current to a reactor, wherein one or more electrodes, which are fed through a wall of the reactor, of an electrical energy network are respectively connected to an electrically conductive element so that an operating voltage is applied to the at least one electrically conductive element and electrical current flows through it, wherein there is respectively a seal made of an insulating material between the wall of the reactor and the electrode, wherein an electrically conductive seal core is embedded in at least one of these seals, wherein the electrically conductive seal core is connected to an insulation monitoring apparatus or to an auxiliary voltage network, and wherein leakage currents made possible by seal damage are identified by means of monitoring an insulation resistance of the seal core or by means of monitoring a flow of current in the auxiliary voltage network.

This method makes it possible to detect impending seal damage by embedding a conductive core and monitoring this core for insulation faults.

It is in this case possible to monitor all the electrodes or electrode seals of a reactor together.

It is however particularly preferable to carry out the monitoring of the electrodes of a reactor individually.

Monitoring of two or more mutually insulated seal cores with different warning levels is also possible.

BRIEF DESCRIPTION OF THE DRAWING

FIG. 1 shows a current feedthrough arrangement (electrode) of electrical energy through a vessel wall.

LIST OF THE REFERENCES USED

1 upper electrode contact
2 vessel wall
3 support disk
4 screw nut
5 electrically conductive seal core
6 electrically insulating seal
7 electrical connection between the seal core and the insulation monitoring
8 contact point of the fault current with the conductive seal core
9 creepage distance or current path with fully intact seal
10 seal damage
11 insulation monitoring apparatus
12 current path in the event of insulation fault shortly before damage to the seal in the region of the sealing surface
13 electrode
14 sealing surfaces During normal operation, the seal 6 functions as electrical insulation between the electrode 13 and the vessel wall 2.

In electrochemical reactors having conductive contamination or conductive deposits inside them, it is then possible for leakage currents to occur from the electrode to the vessel wall or from one electrode to another electrode via the vessel wall.

These electrical leakage currents can be so great that the sealing function of the seal 6 is thereby impaired by electrical energy input. This is caused, for example, by thermal decomposition of the seal material or by loss of the mechanical strength of the seal material.

Depending on the reactor application, this may be hazardous because of emerging gases, but in any event it is undesirable.

Conventionally, these leakage currents are detected by fault current monitoring in a grounded supply network or by insulation monitoring in an ungrounded network.

A disadvantage with these systems is that they usually respond very sensitively and react to all leakage currents. Leakage currents which occur between two heating elements inside the reactor, and which are noncritical, cannot be distinguished in this way from leakage currents which are destructive to the seal. Thus, it frequently happens that reactors need to be prematurely shut down unnecessarily.

The method makes it possible to distinguish a leakage current destructive to the seal from other leakage currents, and therefore increase the availability of the electrochemical reactor.

To this end, a conductive layer (metal core), which can be electrically monitored with a commercially available insulation monitoring apparatus, is embedded in the seal which simultaneously constitutes electrical insulation.

In the event of a leakage current through the seal 8, the insulating embedding 10 is damaged before damage to the actual sealing surface.

The conductive seal core 5 enters into electrical contact with the surroundings, which is observable by a significant decrease in the insulation resistance of the intrinsically high-impedance embedded metal core.

This decrease in the insulation resistance can then be detected by commercially available insulation monitoring apparatuses 11, and used for prewarning or to switch off the electrical energy supply of the reactor.

In this way, the reactor will be shut down only in the event of hazardous or undesired leakage currents.

Noncritical leakage currents inside the electrochemical reactor are no longer detected, and do not lead to shutdown.

When there is a plurality of electrodes per reactor, all the conductive seal cores of a reactor may be electrically connected outside or inside the reactor and the insulation resistance with respect to the reactor vessel may be monitored once.

The monitoring is more selective, however, when each electrode is monitored individually or in groups and one insulation monitor is installed per seal or group.

The electrical conductivity of the core may be selected in a very wide range, but should expediently be at least a factor of 100 greater than the electrical conductivity of the seal material.

The core material is usually selected from the family of electrically conductive solids, for example metals, graphite, carbon, conductive plastics etc. and may have various forms (sheet, grid, fiber mat etc.).

Grids or fiber mats are preferably used, because in this case the seal material can be pressed or cast externally around during production and a compact body can thereby be obtained, the sealing surface is often even stabilized and the flow behavior under pressure of the plastics mostly used based on hydrocarbon and/or hydrogen fluoride is improved.

Nevertheless, loose layer systems which are composed of the different materials mentioned above may also be envisaged, or even shells multiply fitted into one another, which electrically separate the conductive core from the other potentials (electrode or reactor shell).

The fault detection is also possible without an insulation monitoring apparatus, by means of an auxiliary voltage network and arbitrary current monitoring, for example with fuses or an arbitrary current measurement with switching thresholds for prewarning and/or shutdown.

To this end, the metal core is electrically connected to a grounded auxiliary potential. A flow of current then signals the occurrence of a fault.

To this end, one auxiliary voltage network may be used for a plurality of electrodes.

The current monitoring of the individual electrode contacts may then, according to requirements, be carried out individually or for all the electrodes together.

In the scope of the invention, the Inventors have furthermore found that the thermal load on the electrode seals can be reduced by shrinking the seal onto the electrode, which is usually cooled, and reducing the wall thickness of the seal to the electrically and mechanically necessary size.

The seals usually contain polymers, the use of polytetrafluoroethylene (PTFE) being preferred.

The electrode is usually cooled with water. PTFE expands when heated. In this way, the seal can lose contact with the water-cooled electrode and therefore the cooling.

This can be prevented by shrinking the seal.

To this end, the seal is heated, which leads to its expansion, and is subsequently drawn rapidly over the electrode. The seal shrinks again when cooled and is thus pressed onto the electrode and remains very firmly connected thereto. The seal can thus constantly be in contact with the electrode and cooled internally by the electrode.

Shrinkage of a PTFE seal onto the electrode just below the decomposition temperature at about 200-350° C. is preferred, although it may also be carried out at lower temperatures.

The minimum wall thickness of the seal is dictated by the electrical and mechanical requirements of the seal. The wall thickness preferably lies between 0.1 and 3 mm, particularly preferably at about 0.5-2 mm.

The thermal loading on the seal is thereby significantly reduced. Seal damage with subsequent shutdowns of the reactor occurs less frequently, even though the wall thickness of the seal is reduced in comparison with the usual 5 mm.

What is claimed is:

1. A method for supplying current to a reactor, wherein at least one electrode, which is fed through a wall of the reactor, of an electrical energy network which is DC-isolated from ground potential is connected to at least one electrically conductive element so that an operating voltage is applied to the at least one electrically conductive element and electrical current flows therethrough, wherein there is respectively a seal made of an electrically insulating material between the wall of the reactor and the at least one electrode, wherein the electrical energy network is monitored for insulation faults and a fall below a particular insulation resistance of the seal between the at least one electrode and the wall triggers shutdown of an electrical energy supply, and wherein a switching threshold for shutdown of the electrical energy supply is determined by taking into account at least one parameter selected from the group consisting of seal geometry, seal material, supply voltage and a maximum possible electrical energy input into the seal immediately before shutdown, triggered by a maximum possible leakage current through the seal.

2. The method as claimed in claim 1, wherein the switching threshold is determined once by taking into account at least one parameter selected from the group consisting of seal geometry, seal material, supply voltage and the maximum possible electrical energy input into the seal immediately before shutdown, triggered by a maximum possible leakage current through the seal.

3. The method as claimed in claim 1, wherein the switching threshold lies in a resistance range of 0.1-1000 ohms.

4. The method as claimed in claim 1, wherein the switching threshold lies in a resistance range of 0.1-100 ohms.

5. The method as claimed in claim 1, wherein the switching threshold lies in a resistance range of 0.1-10 ohms.

6. The method as claimed in claim 1, wherein the at least one electrically conductive element is a thin rod on which silicon is deposited.

7. The method as claimed in claim 1, wherein the at least one electrically conductive element is a carbon-containing heating element, or a resistance heater, which is used to heat a gas or gas mixture to be treated in the reactor.

8. A method for supplying current to a reactor, wherein at least one electrode, which is fed through a wall of the reactor, of an electrical energy network is connected to at least one electrically conductive element so that an operating voltage is applied to the at least one electrically conductive element and electrical current flows therethrough, wherein there is respectively a seal made of an insulating material between the wall of the reactor and the at least one electrode, wherein an electrically conductive seal core is embedded in at least one seal, wherein the electrically conductive seal core is connected to an insulation monitoring apparatus which monitors resistance of the seal between the at least one electrode and the wall or to an auxiliary voltage network which monitors current flow between the at least one electrode and the wall, and wherein leakage currents made possible by seal damage are identified by monitoring an insulation resistance of the seal core or by monitoring a flow of current in the auxiliary voltage network.

9. The method as claimed in claim 8, wherein, in a case of a plurality of electrodes in the reactor, a plurality of conductive seal cores of a reactor are electrically connected outside or inside the reactor and the insulation resistance with respect to the reactor vessel is monitored once.

10. The method as claimed in claim 8, wherein, in the case of a plurality of electrodes in the reactor, the insulation resistance of each individual electrode seal or the insulation resistance in a plurality of groups is monitored.

11. The method as claimed in claim 8, wherein the seal core comprises a material selected from the group consisting of metals, graphite, carbon and conductive plastics.

12. The method as claimed in claim 8, wherein an electrical resistivity of the seal core is less than $1/100$ of the electrical resistivity of the seal material.

13. The method as claimed in claim 8, wherein the seal core is in a form of a ring, a grid or a fiber mat and is respectively equipped with an electrical connection facility.

14. The method as claimed in claim 8, wherein one auxiliary voltage network is used for a plurality of electrodes.

15. The method as claimed in claim 8, wherein the current monitoring of the individual electrode contacts is carried out individually or for all the electrodes together.

16. A device for simultaneous monitoring, sealing and electrical insulation of an electrode of an electrical energy network, wherein the device comprises a seal containing an electrically conductive core, wherein the electrical energy network is monitored for insulation faults and a fall below a particular insulation resistance of the seal between the at least one electrode and the wall triggers shutdown of an electrical energy supply.

* * * * *